United States Patent
Honda et al.

(10) Patent No.: US 9,317,776 B1
(45) Date of Patent: Apr. 19, 2016

(54) ROBUST STATIC AND MOVING OBJECT DETECTION SYSTEM VIA ATTENTIONAL MECHANISMS

(71) Applicant: HRL Laboratories, LLC, Malibu, CA (US)

(72) Inventors: Alexander L Honda, Sunnyvale, CA (US); Deepak Khosla, Camarillo, CA (US); Yang Chen, Westlake Village, CA (US); Kyungnam Kim, Oak Park, CA (US); Shinko Y. Cheng, Cupertino, CA (US); Lei Zhang, Torrance, CA (US); Changsoo S. Jeong, Rancho Palos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 74 days.

(21) Appl. No.: 14/205,349

(22) Filed: Mar. 11, 2014

Related U.S. Application Data

(60) Provisional application No. 61/779,179, filed on Mar. 13, 2013, provisional application No. 61/779,143, filed on Mar. 13, 2013.

(51) Int. Cl.
| | | |
|---|---|---|
| *G06K 9/00* | (2006.01) | |
| *G06K 9/62* | (2006.01) | |
| *G06T 7/40* | (2006.01) | |
| *G06T 7/60* | (2006.01) | |

(52) U.S. Cl.
CPC .............. *G06K 9/6202* (2013.01); *G06T 7/408* (2013.01); *G06T 7/602* (2013.01)

(58) Field of Classification Search
None
See application file for complete search history.

(56) References Cited

U.S. PATENT DOCUMENTS

| | | | |
|---|---|---|---|
| 2002/0154833 A1* | 10/2002 | Koch et al. ..................... 382/325 |
| 2007/0286526 A1* | 12/2007 | Abousleman ........ G06K 9/4671 |
| | | | 382/284 |
| 2010/0091330 A1* | 4/2010 | Marchesotti et al. ......... 358/1.18 |
| 2012/0189161 A1* | 7/2012 | Chang et al. .................. 382/103 |

OTHER PUBLICATIONS

Hou et al (NPL "Saliency Detection: A spectral Redisual Approach" IEEE 2007, hereafter referred to as Hou).*

(Continued)

*Primary Examiner* — Bhavesh Mehta
*Assistant Examiner* — Oneal R Mistry
(74) *Attorney, Agent, or Firm* — Tope-McKay & Associates

(57) ABSTRACT

Described, is a system for object detection via multi-scale attentional mechanisms. The system receives a multi-band image as input. Anti-aliasing and downsampling processes are performed to reduce the size of the multi-band image. Targeted contrast enhancement is performed on the multi-band image to enhance a target color of interest. A response map for each target color of interest is generated, and each response map is independently processed to generate a saliency map. The saliency map is converted into a set of detections representing potential objects of interest, wherein each detection is associated with parameters, such as position parameters, size parameters, an orientation parameter, and a score parameter. A post-processing step is applied to filter out false alarm detections in the set of detections, resulting in a final set of detections. Finally, the final set of detections and their associated parameters representing objects of interest is output.

15 Claims, 12 Drawing Sheets
(4 of 12 Drawing Sheet(s) Filed in Color)

(56) References Cited

OTHER PUBLICATIONS

Cretu et al (NPL Building Detection in Aerial Images Based on Watershed and Visual Attention Feature Descriptors, 2013 International Conference on Computer and Robot Vision, 978-0-7695-4983-5/13 © 2013 IEEE, pp. 8).*

Kyungnam Kim, Yang Chan, Alexander Honda, Changsoo Jeong, Shoko Cheng, Lei Zhang, Deepak Khosla. "Bio-inspired Algorithms for Target Detection and Classification in Airborne Videos", in Proceedings of AUVSI's Unmanned Systems North America 2012 (AUVSI 2012).

Aniruddha Kambhavi, David Harwood, and Larry S. Davis. Vehicle Detection Using Partial Least Squares, IEEE Trans. Pattern Anal. Mach. Intell, vol. 33, No. 6 (Jun. 2011), 1250-1265.

Paul A. Viola, Michael J. Jones: Robust Real-Time Face Detection. In ICCV 2001: 747.

Yoav Freund and Robert E. Schapire. A decision-theoretic generalization of on-line learning and an application to boosting. In Computational Learning Theory: Eurocolt '95, pp. 23-37. Springer-Verlag, 1995.

Y. LeCun, K. Kavukouoglu and C. Farabet, "Convolutional Networks and Applications in Vision", in International Symposium on Circuits and Systems (ISCAS'10), IEEE, Pans, 2010.

C. Farabet, B. Martini, B. Corda, P. Akselrod, E. Culurciello and Y. LeCun, "NeuFlow: A Runtime Reconfigurable Dataflow Processor for Vision", in Proc. of the Fifth IEEE Workshop on Embedded Computer Vision (ECV'11 @ CVPR'11), IEEE, Colorado Springs, 2011, Invited Paper.

P. F. Felzenszwalb, R. B. Girshick, D. McAllester, and D. Ramanan, Object detection with discriminatively trained part-based models, IEEE Transactions on Pattern Analysis and Machine Intelligence, 32(9):1627-16415, 2009.

Yuv, Lab, and YCrCb color spaces, which are described in Digital Image Processing Using Matlab, 2nd Ed., Chapter 6, 2009 by Gonzalez, Woods and Eddins.

Hou, Xiaodi, and Liqing Zhang. "Saliency detection: A spectral residual approach." In Computer Vision and Pattern Recognition, 2007 in CVPR'07, IEEE Conference on, pp. 1-8, IEEE, 2007.

Itti, L., Koch, C., & Niebur, E. (1998) in "A model of saliency-based visual attention for rapid scene analysis", IEEE Transactions on pattern analysis and machine intelligence, 20(11), 1254-1250.

* cited by examiner

FIG. 2A — Original Image

ROBUST STATIC AND MOVING OBJECT DETECTION SYSTEM VIA ATTENTIONAL MECHANISMS

CROSS-REFERENCE TO RELATED APPLICATIONS

This is a Non-Provisional patent application of U.S. Provisional Application No. 61/779,179, filed in the United States on Mar. 13, 2013, entitled, "Robust Static and Moving Object Detection System via Multi-Scale Attentional Mechanisms."

This is also a Non-Provisional patent application of U.S. Provisional Application No. 61/779,143, filed in the United States on Mar. 13, 2013, entitled, "Selective Color Preprocessing for Vision Systems that Enables Optimal Detection and Recognition."

GOVERNMENT LICENSE RIGHTS

This invention was made with government, support under U.S. Government Contract Number HR0011-10-C-0033 Neovision2. The government has certain rights in the invention.

BACKGROUND OF THE INVENTION (1) Field of Invention

The present invention relates to a system for object detection and, more particularly, to a system for object detection via multi-scale attentional mechanisms.

(2) Description of Related Art

Traditional computer vision approaches to high level functions, such as recognition on static images, generally involve exhaustive computations. Exhaustive scan methods use a trained classifier to search for instances of the target object class. These methods are able to detection objects in static images, but have two major shortcomings. Exhaustive search and application of a classifier makes these methods too slow to run in real- or near-real time. A training stage requires significant additional offline processing time, which must be performed for new target classes. They also require large amounts of human annotated training data which otherwise may not be required by the rest of the system. Results are heavily dependent on the training data, making these methods blind to novel object classes. In other words, the methods suffer from being unable to detect objects that are dissimilar to training examples.

Another class of methods used for object detection is based on motion detection. These methods require video sequence input in order to estimate frame-to-frame differences, which is not always available. Motion estimation can suffer when frame rate is low for methods such as optical flow, which can also take longer to process than feature based methods. Feature based motion estimation typically uses planar homography to estimate global motion, but requires the often incorrect assumption that features are located on a flat surface. This is an effective way to detect moving objects, but is in incapable of detection of stationary objects and cannot be applied to static images. Saliency algorithms are biologically inspired methods used to generate output similar in spirit to the output maps of motion detection and exhaustive classification, but are much faster.

Thus, a continuing need exists for a system that uses color and size cues to detect objects from static images and merge proto-objects, allowing the system to detect generic objects without training examples.

SUMMARY OF THE INVENTION

The present invention relates to a system for object detection and, more particularly, to a system for object detection via multi-scale attentional mechanisms. The system comprises one or more processors and a memory having instructions such that when the instructions are executed, the one or more processors perform multiple operations. The system receives a multi-band image having a size as input. An anti-aliasing process and a downsampling process is performed to reduce the size of the multi-band image. Targeted contrast enhancement is performed on the multi-band image to enhance at least one target color of interest. A response map for each target color of interest is generated, and each response map is processed independently through a saliency process to generate at least one saliency map. The at least one saliency map is converted into a set of detections representing potential objects of interest, wherein each detection in the set of detections is associated with a plurality of parameters selected from the group consisting of: position parameters, size parameters, an orientation parameter, and a score parameter. The set of detections are filtered in a post-processing process to reduce false alarms, resulting in a final set of detections. Finally, the final set of detections and their associated plurality of parameters representing objects of interest are output.

In another aspect, the post-processing process receives, as input, a confidence function which takes each detection in the set of detections and its associated plurality of parameters and outputs a probability of acceptance for further processing for each detection.

In another aspect, the score parameter is a value which indicates the detection's strength or confidence in the saliency map.

In another aspect, the saliency process is a spectral residue saliency process.

In another aspect, stationary and moving objects of unknown type are detected from the multi-band image.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 2A depicts an original image prior to processing according to the principles of the present invention;

DETAILED DESCRIPTION

Figure 1:
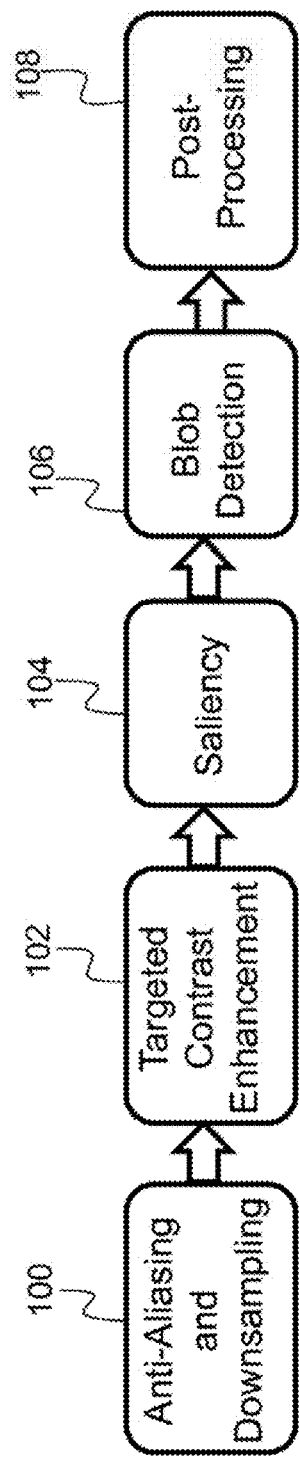
FIG. 1 is a flow diagram illustrating the processes performed by the object detection system via multi-scale attentional mechanism according to the principles of the present invention.

The present invention relates to a system for object detection and, more particularly, to a system for object detection via multi-scale attentional mechanisms. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for object detection via multi-scale attentional mechanisms. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object detection via multi-scale attentional mechanisms. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

Detection of objects with unknown types in static images is a difficult problem. Stationary objects with known type can be detected in moving and static images using trained classifiers, but this type of process requires exhaustive scans and is slow. Moving objects with unknown types can be detected by finding relative motion between frames in video sequences. Object motion in images is often confounded by texture variance, which gives the appearance of motion. Furthermore, measurable motion is concentrated around the edges of homogeneous objects, meaning that motion is an indicator of the edges of an object, but not a direct measure of the position of it. Sometimes additional, locally exhaustive scans must then be performed in the area.

The bio-inspired, attention based system of the present invention overcomes these limitations and is able to detect stationary and moving objects with unknown type. Furthermore, the system described herein naturally extends to processing video data; due to its speed, it can quickly process consecutive frames in image sequences. Because it processes data on a frame-by-frame basis, no image registration or stabilization is required. Therefore the present invention can be applied to video images taken from both moving and stationary platforms.

The present invention takes as input full resolution, multi-channel images and outputs a set of detections represented by six parameters: two position parameters, two size parameters, one orientation parameter, and one score parameter. This is a convenient and minimal representation of detections that suffices to describe the core system output. One low bandwidth interface that can be implemented using this minimal representation is image chip passing. Rather than using a system control station to process the entire image, which consumes significant amounts of time and resources, the system can use the original image and the detections to create image patches, commonly called image chips, on the sensor platform. The image chips can then be passed to the control station. By doing this, the bandwidth usage, processing load of the control station and operator workload at the control station can be reduced. Other aspects may have different restrictions on data format, which can be satisfied by deriving the necessary information from the set of detections and local data available to the system.

The present invention acts as a fast, parallelizable screening step to the resource heavy steps of the vision process. As described above, it reduces the original full image input of a computer vision system down to a handful of detections. This means that full images need not be transmitted in applications with bandwidth limited links, but only a handful of small image chips. Some applications may not even require chips, allowing the system to transmit just the basic properties of the detections. Because it is a bio-inspired approach, the system according to the principles of the present invention has the advantage of producing detections of novel objects which a trained classifier or detector may not detect. Furthermore, it can act as a front end for any system which does not require the full input image.

FIG. 1 is a flow diagram illustrating the processes performed by the object detection system via multi-scale attentional mechanisms according to the principles of the present invention. The processes include an anti-aliasing and down-sampling process 100, a targeted contrast enhancement process 102, a saliency process 104, a blob detection process 106, and a post-processing process 108. Each of these processes is described in further detail below.

(2.1) Anti-Aliasing and Downsampling

The following describes a standard preprocessing practice for dealing with large images (depicted as element 100 in FIG. 1). In the present invention, the purpose of this process is twofold: it sets the scale for detection and it reduces the computational load for the subsequent processing. When looking for objects, humans fixate their attention to a specific scale. Downsampling achieves a similar effect. Furthermore, downsampling reduces the total number of pixels that need to be processed by the saliency process (depicted as element 104 in FIG. 1).

Before downsampling can be performed, anti-aliasing must be applied to avoid introducing image artifacts. This is achieved by applying a low pass isotropic Gaussian filter to the bands of the original image via convolution. The size and sigma of this filter are chosen based on the downsampling ratio, in order to satisfy the Nyquist criterion. The output from the anti-aliasing and downsampling process (depicted as element 100 in FIG. 1) is an image with the same number of channels as the original input, but with reduced size, which is determined by the downsampling ratio input parameter selected by the user.

(2.2) Targeted Contrast Enhancement

Humans use both color cues and motion cues to discriminate form. In static images, there are no motion cues to process, but color cues can be used to aid detection. The following describes how the system according to the principles of the present invention uses colors supplied as input to steer the detection process. Depending on the application, these input colors may be user specified or feedback from higher level recognition. The use of a feedback loop enables adaptation to subtle illumination changes and slow changes in target color.

The term "color" is used to indicate a vector of scalar pixel color values across all image channels. In one aspect, three channel RGB (red, green, blue) colors are used; however, the system can also use, but is not limited to, Yuv, Lab, and YCrCb color spaces, which are described in Digital Image Processing Using Matlab, 2nd Ed., Chapter 6, 2009 by Gonzalez, Woods and Eddins, which is hereby incorporated by reference as though fully set forth herein. In addition, if the number of image channels exceeds three, the notion of "color" also encompasses multi-/hyper-spectral data, as well as multi-modal data.

To perform targeted contrast enhancement (depicted as element 102 in FIG. 1), a non-linear function is applied to image pixel color with respect to a user-specified target color to produce a response map. That is, for an image pixel with color I and target color t, the following function is applied to get the value in the response map:

$$f(I; t) = \exp\left(-\beta \sum_k (x_k - t_k)^2\right),$$

where $\exp(x)$ is the exponent function $e^x$, $\beta$ is a user specified sensitivity parameter, $I=\{x_k\}$ and $t=\{t_k\}$ are the color vectors of the image pixel and the target color, respectively, and k is the index for the color or channel components. This function will result in 1 when the image is exactly the target color, and its value will fall off towards 0 as the color differs from the mean. The $\beta$ value determines how quickly the function output drops off. A high value of $\beta$ results in a larger range of output values for image pixel colors very close to the target color, while a low value of $\beta$ results in less such range expansion. In addition to spreading the range of the target color, this also has the effect of making the target color have the peak response. This effect is desirable because of the tendency of saliency (depicted as element 104, FIG. 1) to favor bright (i.e., high response) objects on dark background. The result of this targeted contrast enhancement process (depicted as element 102 in FIG. 1) is multiple response maps, one for each target color. The response maps will have dimensions equal to the subsampled image, but have only one channel each. Alternatively, they can be viewed as a single image with the number of image channels equal to the number of target colors.

Figure 2B:
FIG. 2B depicts the image of FIG. 2A that has been processed with the targeted contrast enhancement process according to the principles of the present invention.

FIGS. 2A and 2B illustrate the effect of proper color selection and contrast enhancement. FIG. 2A depicts an original image prior to processing. FIG. 2B depicts the image of FIG. 2A that has been processed with the targeted contrast enhancement process (FIG. 1, 102) with a target color black=[0,0,0](that is, the pixel color values of all three channels, red, green and blue, are 0.) and a $\beta$ value=55. As shown in FIG. 2B, the low contrast vehicle 200 in the shade of the tree 202 is enhanced so that it clearly stands out from the shadows.

(2.3) Saliency

The resulting contrast-enhanced response maps from the targeted contrast enhancement process (FIG. 1, element 102) are then passed through a saliency process (depicted as element 104 in FIG. 1) independently. This independence allows for a straight-forward implementation of a parallelized embodiment. There are many existing saliency algorithms, such as those described by Hou, Xiaodi, and Liqing Zhang.

"Saliency detection: A spectral residual approach." In Computer Vision and Pattern Recognition, 2007 in CVPR'07, IEEE Conference on, pp. 1-8. IEEE, 2007 (hereinafter referred to as Hou et al.), and by Itti, L., Koch, C., & Niebur, E. (1998) in "A model of saliency-based visual attention for rapid scene analysis", IEEE Transactions on pattern analysis and machine intelligence, 20(11), 1254-1259, both which are hereby incorporated by reference as though fully set forth herein. The saliency process (depicted as element 104 in FIG. 1) is the core of the system described herein in terms of computation time.

In one aspect of the present invention, the system was implemented using spectral residual, introduced by Hou et al. In practice this process/algorithm is desirable due to its speed and efficiency since much of the computation is centered on spectral analysis using Fourier transforms for which open-source implementation of FFT (fast Fourier Transform algorithm) can be used. The core of the saliency algorithm described in Hou et al. is as follows: (1) convert an image into the Fourier domain; (2) calculate the phase and amplitude; (3) apply a high pass filter to the log amplitude; and (4) transform back into spatial domain using the modified amplitude and original phase.

(2.4) Blob Detection

The next process is converting each saliency map into detections of candidate objects represented as position parameters, size parameters, an orientation, and a score parameter in a process known as "blob detection" (depicted as element 106 in FIG. 1). There are a number of methods for performing blob detection that provides location and size of the detections. This usually involves, but is not limited by, a thresholding step, morphological operations, and a labeling step.

In experimental studies of the present invention, a simple threshold was used to create a binary image with 1 representing potential presence of objects to be detected, and 0 the background. In the implemented aspect, morphological operations were then applied to the binary image to reduce the number of spurious detections and merging fragmented parts into a whole. Then, the cvBlob library was used to perform the blob detection. cvBlob is an open source library for computer vision to detect connected regions in binary digital images, and can be found at http://code.google.com/p/cvblob/(2014). cvBlob runs a connected component algorithm to produce a labeled map. That is, each set of connected pixels of "1"s is given a unique identification (ID) or label. Then, for each label present, cvBlob calculates the centroids and moments for the set of pixels represented by the label. The centroid and moments are then used to estimate the center, size and orientation of the detection.

As described above, the score parameter is one of the manners of representing a detection. The score in the blob detection process is an associated value which indicates the detection's strength or confidence in the detection being an actual object of interest. One possible scoring method is using the average saliency value in the detection. That is, for each detection and the associated set of image pixels, one goes back to the original saliency map, and retrieves the saliency map value at these pixels and takes the average as the score for the detection. Another such possible method is using the maximum saliency value. That is, one takes the maximum of the saliency map values as opposed to the average as in the previous case. In principal, any arbitrary function can be applied to the detection, original image, response map, saliency map, or any other local data related to the detections.

In practice it was determined that a simple scoring function sufficed for providing a processing order heuristic for classification, which is outside the scope of the present invention. More elaborative forms of scoring functions may be beneficial to specific applications at the expense of additional computation. In one aspect of the present invention, the maximum saliency value as the detection score was used for its simplicity and relative effectiveness.

(2.5) Post-Processing

In the final stage, the post-processing process (depicted as element 108 in FIG. 1), the system uses parameters such as expected target size, location, and score to quickly filter out what would otherwise be false alarms. The post-processing process (FIG. 1, element 108) accepts as input a function which takes the detection and associated parameters, and returns a probability of acceptance (a scalar in the range of 0 to 1, inclusive). This function, called "confidence function", is applied to each detection, which is then accepted or rejected based on the probability of acceptance. In cases where the control station is unable to process the entirety of the system's detection output, the post-processing process (FIG. 1, element 108) can reduce the number of output detections by rejecting detections with a probability of acceptance lower than a specified threshold value chosen between 0 and 1.

It was determined through experimental studies that detection size is a key indicator of the legitimacy of an object, as is aspect ratio (i.e., the ratio between width and height). In one aspect of the present invention, when the number of detections is relatively small, and all of the detections of the system can be processed in a reasonable amount of time by the control station of the system, one can use a very simple confidence function, such that if the detection meets certain size and aspect ratio requirements, it generates an acceptance probability of 1.0, guaranteeing the detection's acceptance. Otherwise, it generates an acceptance probability of 0.0, ensuring the detection's rejection. For example, such a confidence function can be defined to verify that a detection is at least 100 pixels, and no more than 3000 pixels in size, and the ratio of its width (the longer side) and height (the shorter side) is no more than 2.0.

(2.6) Experimental Results

The present invention was tested on two different data sets. Both data sets contained video data with fixed and moving targets. One data set was collected from a moving platform. The other data set was collected from a stationary platform. Both data sets contain images with targets such as bicyclists, pedestrians, and vehicles, such as cars, trucks, and buses.

Figure 3A:
FIG. 3A depicts an original image collected from a moving platform prior to processing according to the principles of the present invention.
Figure 3B:
FIG. 3B depicts a result of the targeted contrast enhancement process according to the principles of the present invention.
Figure 3C:
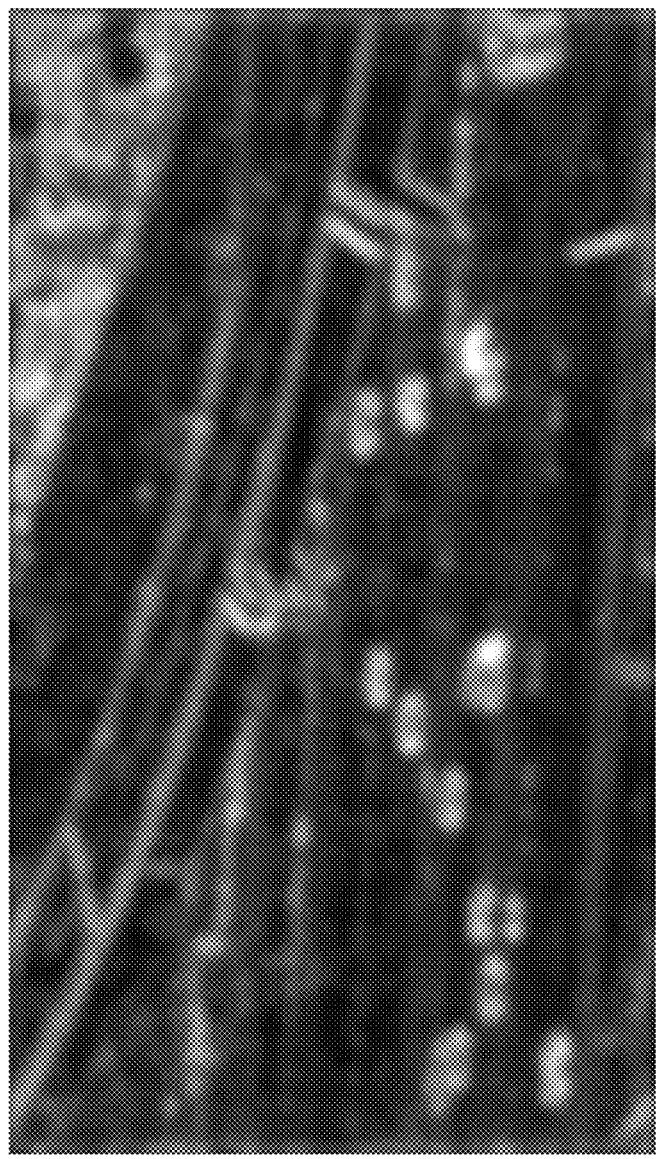
FIG. 3C depicts a result of the saliency process according to the principles of the present invention.
Figure 3D:
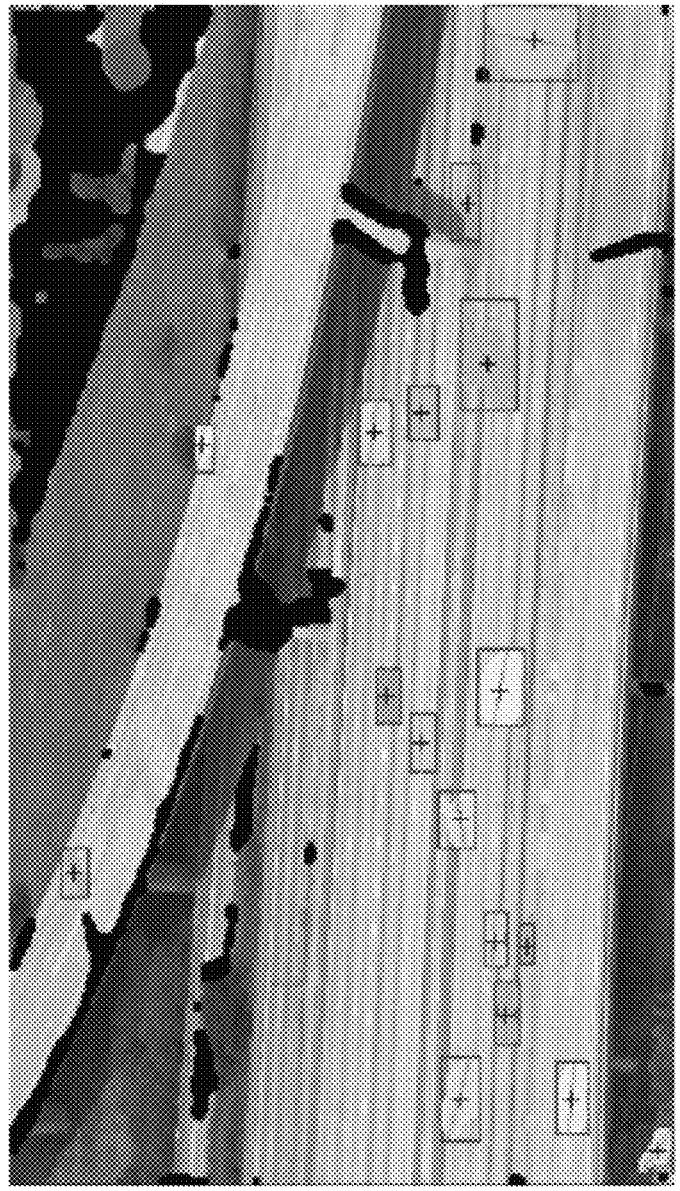
FIG. 3D depicts a result of the blob detection process according to the principles of the present invention.
Figure 3E:
FIG. 3E depicts the final output of the image processing according to the principles of the present invention.

FIGS. 3A-3E depict sample snapshots of the different processes of the system according to the principles of the present invention. FIG. 3A is a sample original image collected from a moving platform prior to any processing. First, the anti-aliasing and downsampling process (FIG. 1, element 100) was performed (not depicted) on the original image followed by the targeted contrast enhancement (depicted as element 102 in FIG. 1) as shown in FIG. 3B, which shows the black colors in the image enhanced. Next, the response maps (in this example, only one map) from targeted contrast enhancement were processed through a saliency algorithm, such as spectral residue saliency, (i.e., the saliency process, element 104), the result of which is shown in FIG. 3C. The blob detection process (FIG. 1, element 106) was applied followed by filtering based on size and aspect ratio (i.e., the post-processing process depicted as element 108 in FIG. 1), as shown in FIG. 3D. Blobs are represented by colored areas surrounded by a detection box. The final output is a set of detections (surrounded by detection boxes) represented by position, size, and orientation, as shown in FIG. 3D. As depicted in FIG. 3D, the orientation of the detection boxes has been adjusted to correspond to each object.

Figure 4:
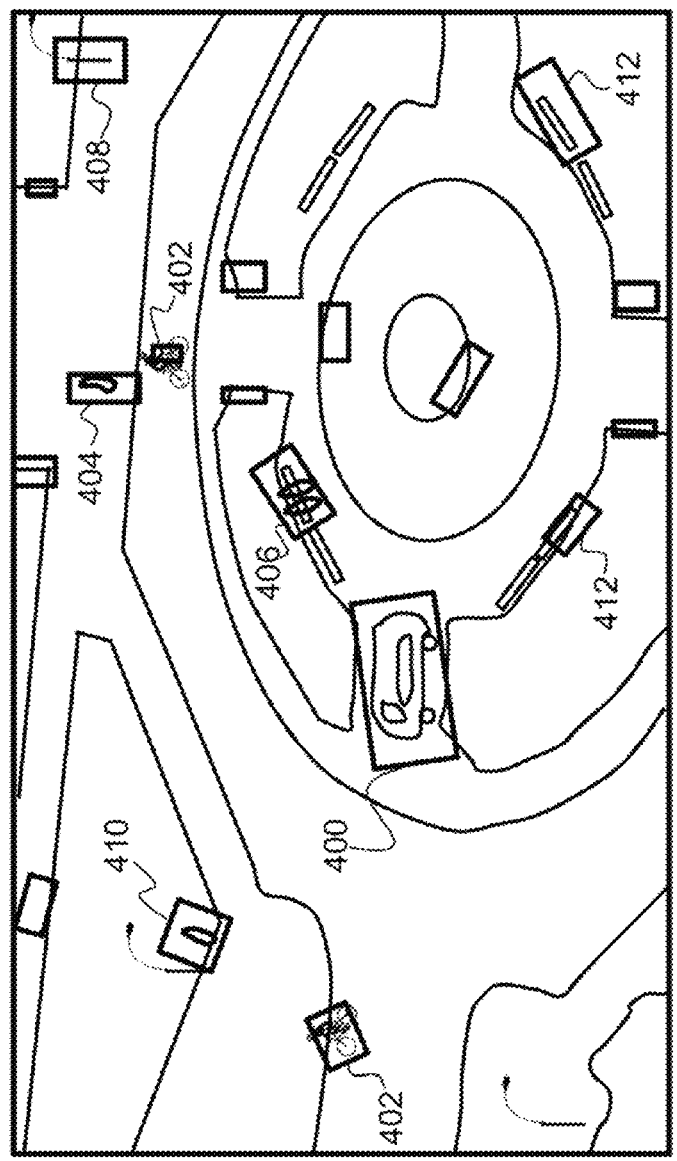
FIG. 4 illustrates a snapshot of detections from a sample frame collected from a stationary platform according to the principles of the present invention.

FIG. 4 illustrates an example snapshot of detections (represented by rectangles) from a stationary platform data set. It is able to detect objects such as a car 400, bicyclists 402, a pedestrian 404, and a seated couple 406. Some of the "false positives" include a lamp post 408, a fire hydrant 410, and benches 412.

Figure 5:
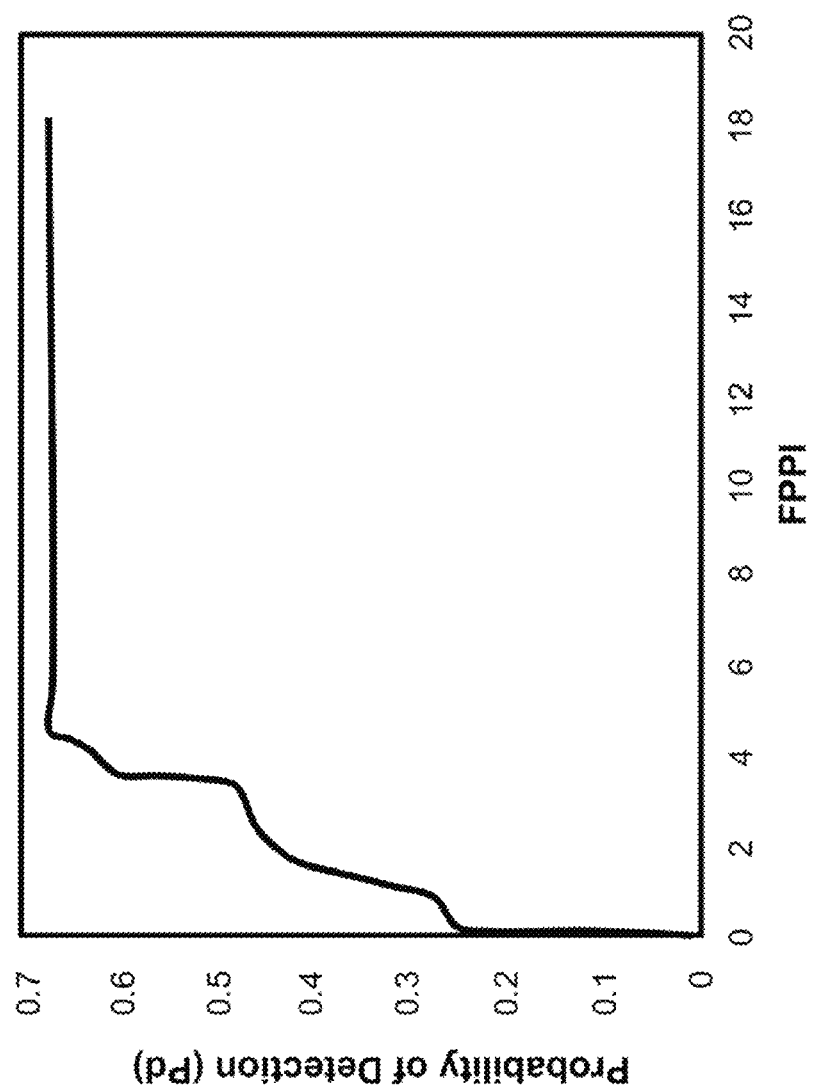
FIG. 5 is a receiver-operator curve (ROC) plot of the detection percentage against the false positives per frame for the sample frame illustrated in FIG. 4 according to the principles of the present invention.

FIG. 5 is a receiver-operator curve (ROC) plot of the detection percentage against the false positives per frame for the snapshot illustrated in FIG. 4. The plot indicates system performance and trade-offs. Along the x-axis are false positives per image (FPPI), and along the y-axis is the probability of detections (Pd). The ground truth for the curve contained only persons, cars, buses, cyclists, and trucks. Novel objects, which would be missed by classification-based methods, such as fire hydrants, benches, and light posts, were captured here, but recorded as false positives. Due to detection of these novel object classes, visual inspection will indicate better performance than standard methods for evaluating traditional algorithms.

In summary, the present invention is a system for detecting and extracting objects in a single image. It is capable of operating at multiple scales, targeting pre-attentive proto-objects through cues known to be strong indicators in humans, including, but not limited to, color, scale, and orientation. The system uses color, size, and orientation cues in conjunction with form cues from standard saliency algorithms. It is designed to act as a frontend to higher cost backend systems implemented in a control station separate from the sensor platform, such as automated classification or manual screening.

Figure 6:
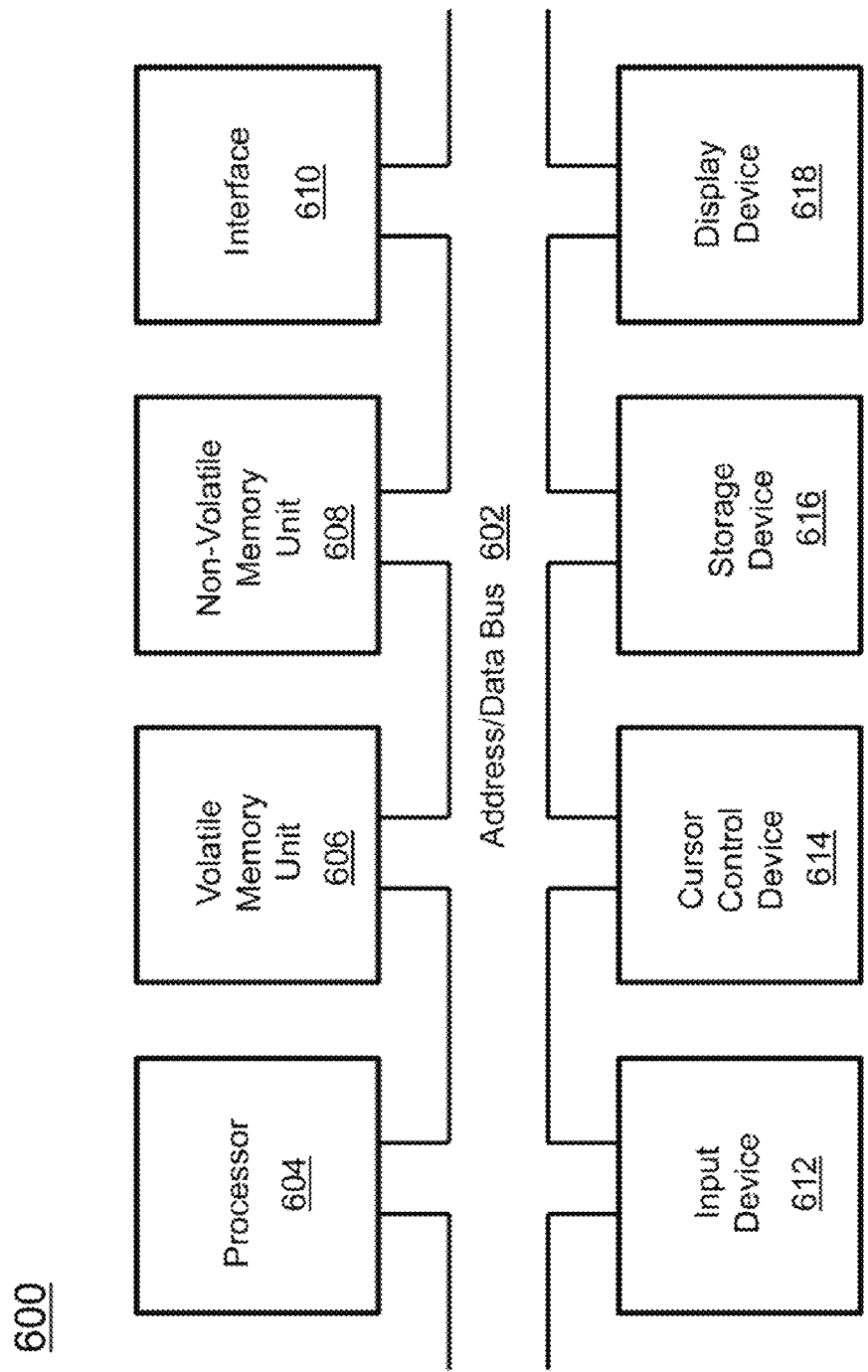
FIG. 6 is an illustration of a data processing system according to the principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
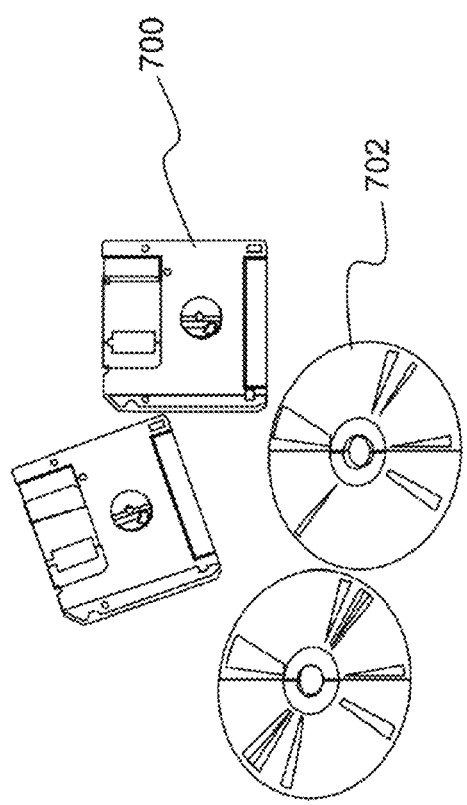
FIG. 7 is an illustration of a computer program product according to the principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for object detection via attentional mechanisms, the system comprising:
   one or more processors and a non-transitory computer-readable medium having executable instructions encoded thereon such that when executed, the one or more processors perform operations of:
   receiving a multi-band image as input, the multi-band image having a size;
   performing an anti-aliasing process and a downsampling process to reduce the size of the multi-band image;
   performing targeted contrast enhancement on the multi-band image to enhance at least one target color of interest;
   generating a response map for each target color of interest;
   processing each response map independently through a saliency process to generate at least one saliency map;
   converting the at least one saliency map into a set of detections representing potential objects of interest, wherein each detection in the set of detections is associated with a plurality of parameters selected from the group consisting of: position parameters, size parameters, an orientation parameter, and a score parameter;
   filtering the set of detections in a post-processing process to reduce false alarms, resulting in a final set of detections; and
   outputting the final set of detections and their associated plurality of parameters representing objects of interest.

2. The system as set forth in claim 1, wherein the post-processing process receives, as input, a confidence function which takes each detection in the set of detections and its associated plurality of parameters and outputs a probability of acceptance for further processing for each detection.

3. The system as set forth in claim 2, wherein the score parameter is a value which indicates the detection's strength or confidence in the saliency map.

4. The system as set forth in claim 3, wherein the saliency process is a spectral residue saliency process.

5. The system as set forth in claim 4, wherein the one or more processors further perform an operation of detecting stationary and moving objects of unknown type from the multi-band image.

6. A computer-implemented method for object detection via attentional mechanisms, comprising:
   an act of causing a data processor to execute instructions stored on a non-transitory memory such that upon execution, the data processor performs operations of:
   receiving a multi-band image as input, the multi-band image having a size;
   performing an anti-aliasing process and a downsampling process to reduce the size of the multi-band image;
   performing targeted contrast enhancement on the multi-band image to enhance at least one target color of interest;
   generating a response map for each target color of interest;
   processing each response map independently through a saliency process to generate at least one saliency map;
   converting the at least one saliency map into a set of detections representing potential objects of interest, wherein each detection in the set of detections is associated with a plurality of parameters selected from the group consisting of: position parameters, size parameters, an orientation parameter, and a score parameter;
   filtering the set of detections in a post-processing process to reduce false alarms, resulting in a final set of detections; and
   outputting the final set of detections and their associated plurality of parameters representing objects of interest.

7. The method as set forth in claim 6, wherein the post-processing process receives, as input, a confidence function which takes each detection in the set of detections and its associated plurality of parameters and outputs a probability of acceptance for further processing for each detection.

8. The method as set forth in claim 7, wherein the score parameter is a value which indicates the detection's strength or confidence in the saliency map.

9. The method as set forth in claim 8, wherein the saliency process is a spectral residue saliency process.

10. The method as set forth in claim 9, wherein the data processor further performs an operation of detecting stationary and moving objects of unknown type from the multi-band image.

11. A computer program product for object detection via attentional mechanisms, the computer program product comprising computer-readable instructions stored on a non-transitory computer-readable medium that are executable by a computer having a processor for causing the processor to perform operations of:
   receiving a multi-band image as input, the multi-band image having a size;
   performing an anti-aliasing process and a downsampling process to reduce the size of the multi-band image;
   performing targeted contrast enhancement on the multi-band image to enhance at least one target color of interest;
   generating a response map for each target color of interest;
   processing each response map independently through a saliency process to generate at least one saliency map;
   converting the at least one saliency map into a set of detections representing potential objects of interest, wherein each detection in the set of detections is associated with a plurality of parameters selected from the group consisting of: position parameters, size parameters, an orientation parameter, and a score parameter;
   filtering the set of detections in a post-processing process to reduce false alarms, resulting in a final set of detections; and
   outputting the final set of detections and their associated plurality of parameters representing objects of interest.

12. The computer program product as set forth in claim 11, wherein the post-processing process receives, as input, a confidence function which takes each detection in the set of detections and its associated plurality of parameters and outputs a probability of acceptance for further processing for each detection.

13. The computer program product as set forth in claim 12, wherein the score parameter is a value which indicates the detection's strength or confidence in the saliency map.

14. The computer program product as set forth in claim 13, wherein the saliency process is a spectral residue saliency process.

15. The computer program product as set forth in claim 14, further comprising instructions for causing the processor to perform an operation of detecting stationary and moving objects of unknown type from the multi-band image.

* * * * *